United States Patent
Koo et al.

(10) Patent No.: US 10,017,873 B1
(45) Date of Patent: Jul. 10, 2018

(54) METHOD FOR FORMING COATING LAYER CONTAINING MAGNESIUM ON METAL SUPPORT, CATALYST SUPPORT AND CATALYTIC CONVERTER, INCLUDING COATING LAYER CONTAINING MAGNESIUM FORMED BY THE SAME METHOD

(71) Applicant: KOREA INSTITUTE OF ENERGY RESEARCH, Daejeon (KR)

(72) Inventors: Kee Young Koo, Daejeon (KR); Wang Lai Yoon, Daejeon (KR); Un Ho Jung, Daejeon (KR); Hyo Been Im, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 0 days.

(21) Appl. No.: 15/681,021

(22) Filed: Aug. 18, 2017

(30) Foreign Application Priority Data

Apr. 10, 2017 (KR) .................. 10-2017-0045820

(51) Int. Cl.
| | |
|---|---|
| *C25D 13/12* | (2006.01) |
| *C25D 13/22* | (2006.01) |
| *B01J 23/02* | (2006.01) |
| *B01J 23/86* | (2006.01) |
| *B01J 37/02* | (2006.01) |
| *B01J 37/03* | (2006.01) |
| *B01J 21/10* | (2006.01) |

(52) U.S. Cl.
CPC .............. *C25D 13/12* (2013.01); *B01J 21/10* (2013.01); *B01J 23/862* (2013.01); *B01J 37/0225* (2013.01); *B01J 37/035* (2013.01); *C25D 13/22* (2013.01)

(58) Field of Classification Search
CPC . B01J 21/10; B01J 23/02; B01J 23/862; B01J 37/0225; B01J 37/035; C25D 13/12; C25D 13/22
See application file for complete search history.

(56) References Cited

U.S. PATENT DOCUMENTS

| | | | | |
|---|---|---|---|---|
| 3,450,787 A | * | 6/1969 | Kehl .................. | B01J 23/36 502/306 |
| 4,049,582 A | * | 9/1977 | Erickson .............. | B01D 53/945 502/306 |
| 4,522,940 A | * | 6/1985 | Sambrook .............. | B01J 23/78 423/654 |
| 4,956,329 A | * | 9/1990 | Chao .................. | B01D 53/945 502/235 |
| 6,521,566 B1 | * | 2/2003 | Magno .................. | B01J 21/06 502/325 |

(Continued)

*Primary Examiner* — Cam N Nguyen
(74) *Attorney, Agent, or Firm* — Birch, Stewart, Kolasch & Birch, LLP

(57) ABSTRACT

An embodiment of the invention provides a method for forming a magnesium (Mg)-containing coating layer on the surface of a metal support, which comprises a first step of preparing a precursor solution containing a magnesium component, a second step of forming a precipitate on the surface of a metal support by immersing and aging the metal support in the precursor solution prepared in the first step, and a third step of forming a magnesium-containing coating layer on the surface of the metal support by calcinating the precipitate formed in the second step.

21 Claims, 9 Drawing Sheets

(56) References Cited

U.S. PATENT DOCUMENTS

| | | | |
|---|---|---|---|
| 7,585,812 B2* | 9/2009 | Hu | B01J 23/75 502/241 |
| 7,625,476 B2* | 12/2009 | Shimoda | C25D 13/18 204/484 |
| 7,906,002 B2* | 3/2011 | Shimoda | C25D 13/18 204/484 |
| 8,952,076 B2* | 2/2015 | Rytter | B01J 21/005 502/302 |
| 2011/0182792 A1* | 7/2011 | Suzuki | B01J 23/002 423/245.3 |

* cited by examiner

【Fig. 1】
(a)
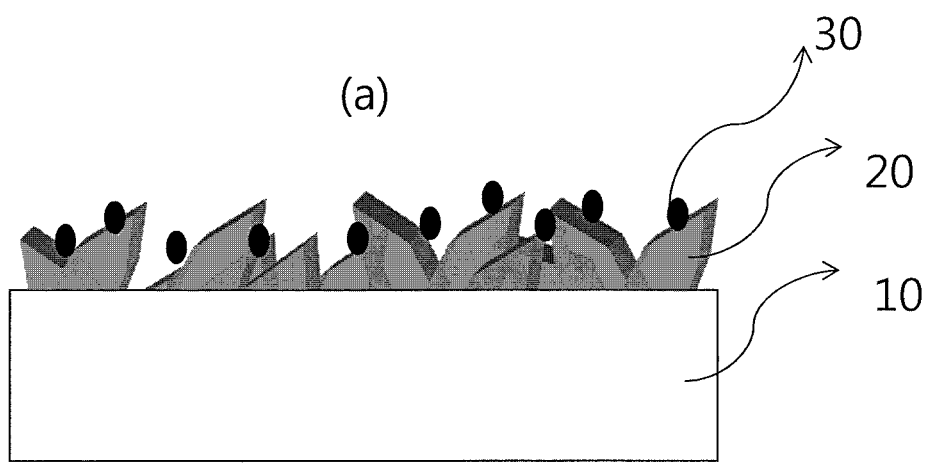
(b)
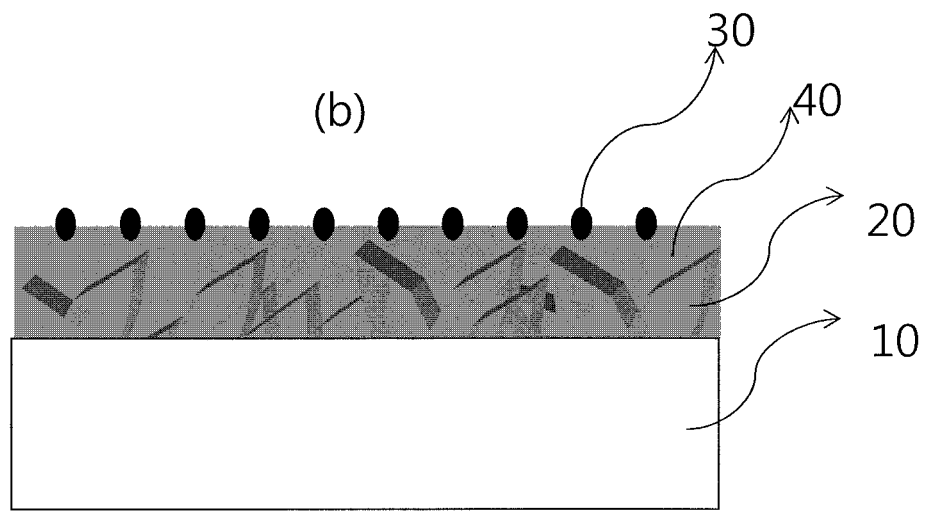

[Fig. 2]
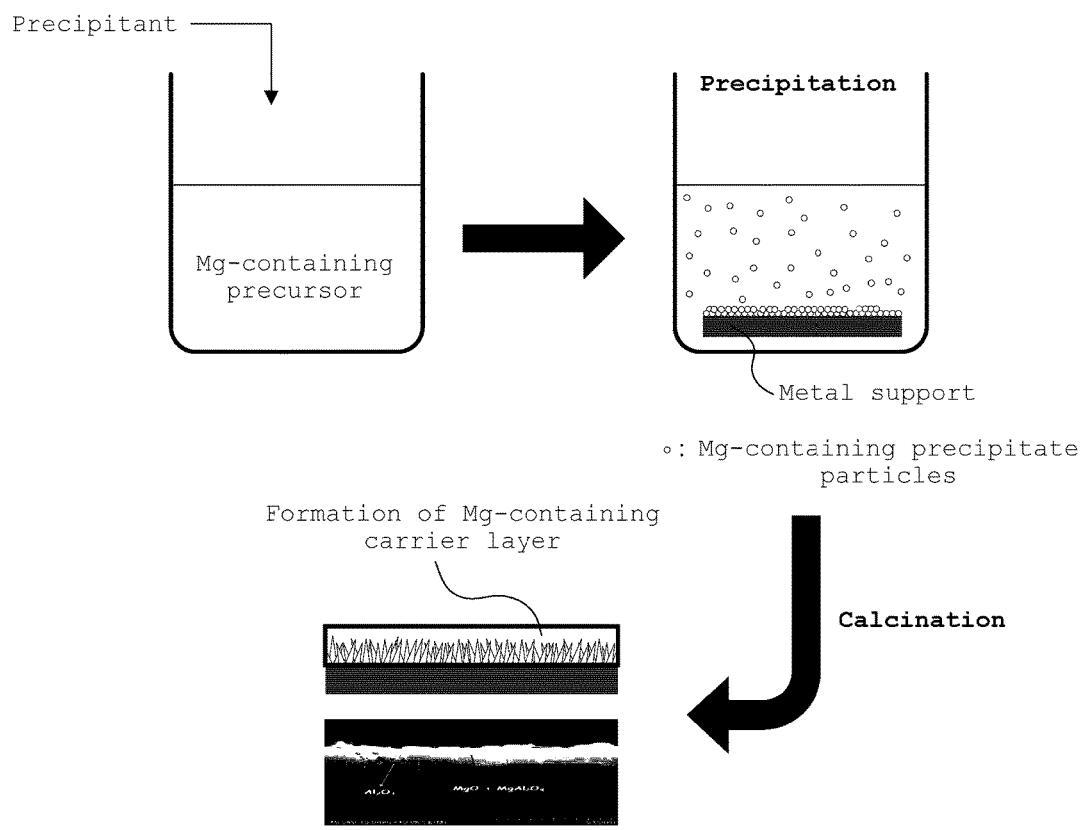

[Fig. 3]
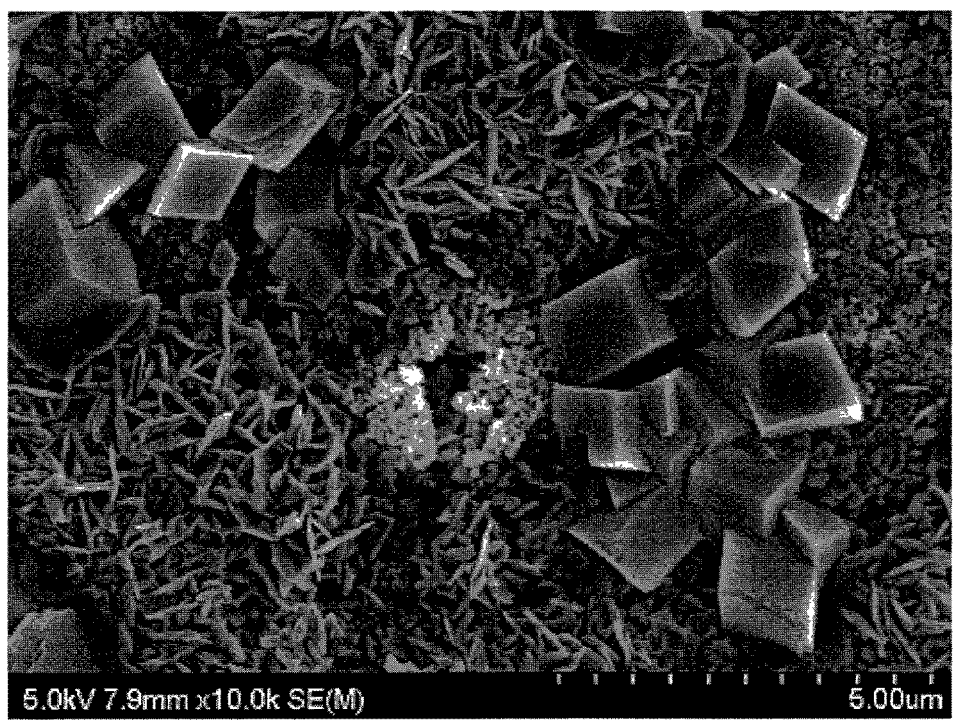

[Fig. 4]
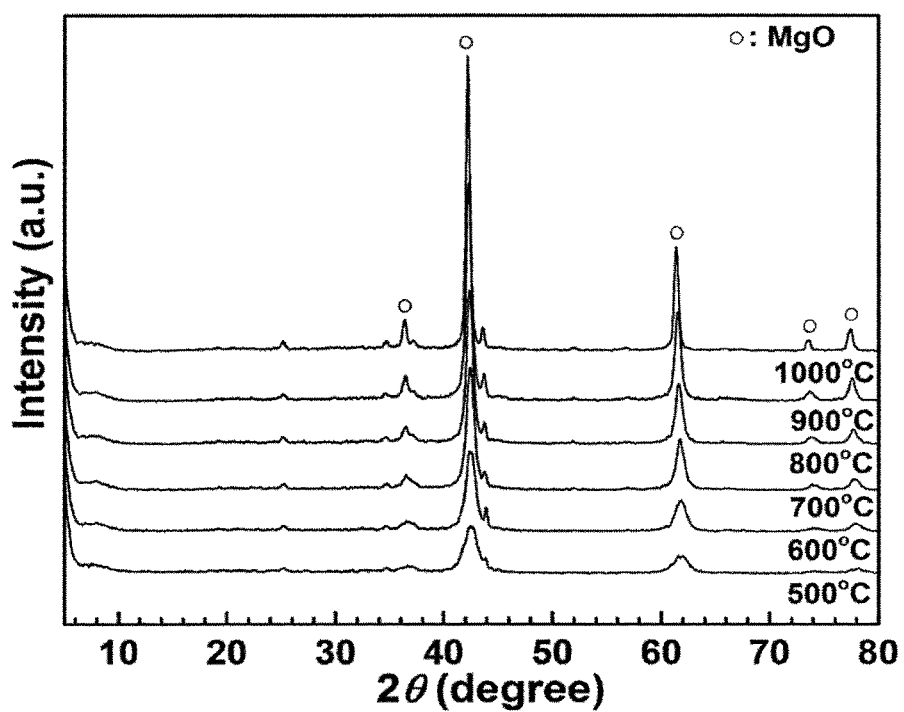

[Fig. 5]
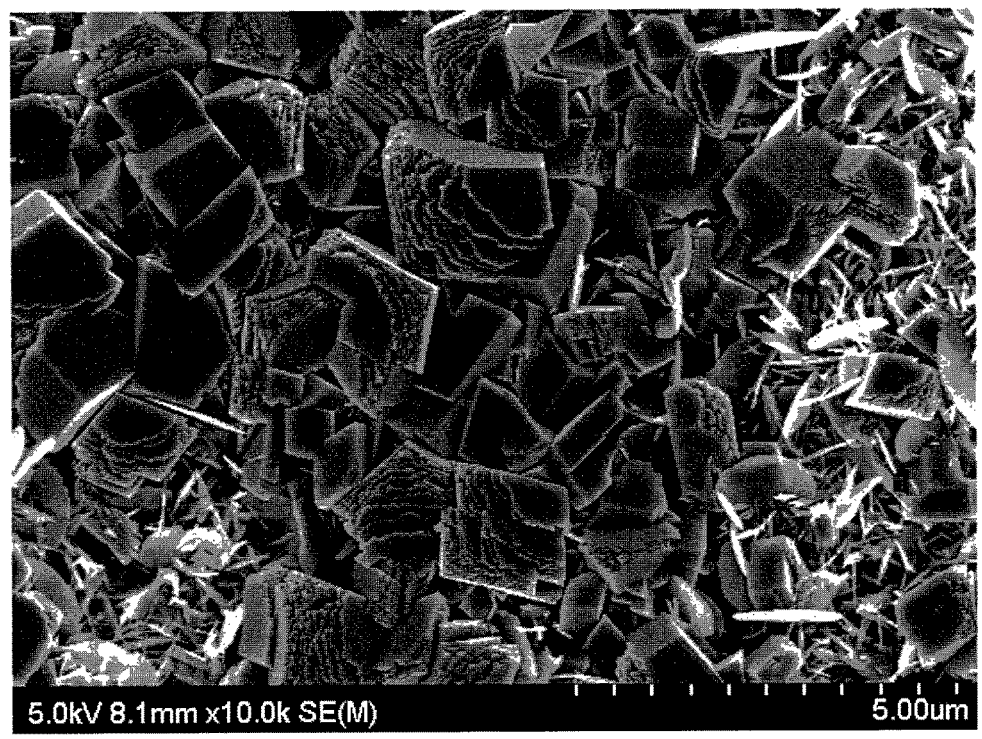

[Fig. 6]
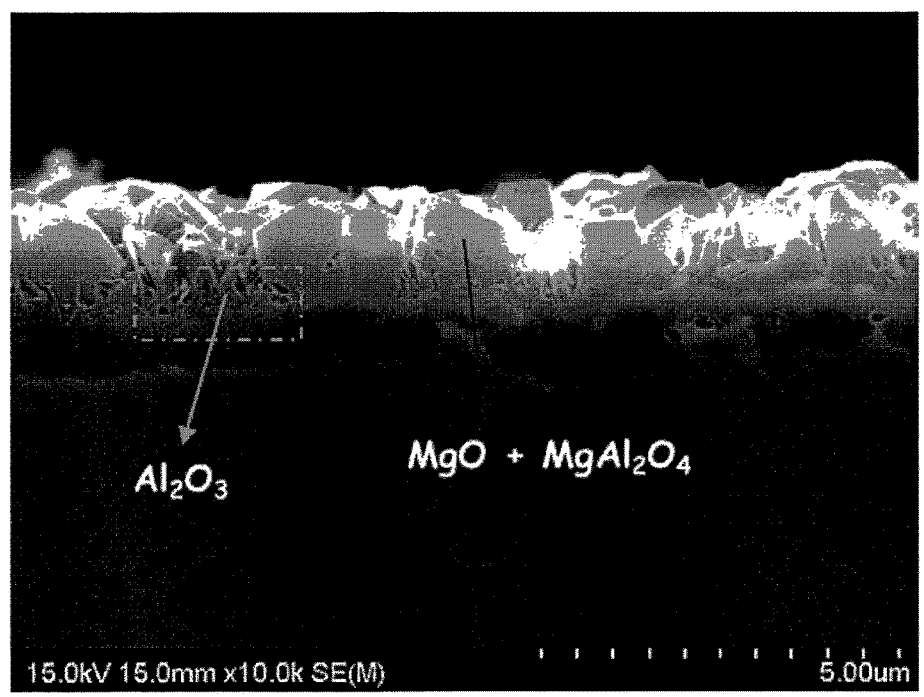

[Fig. 7]
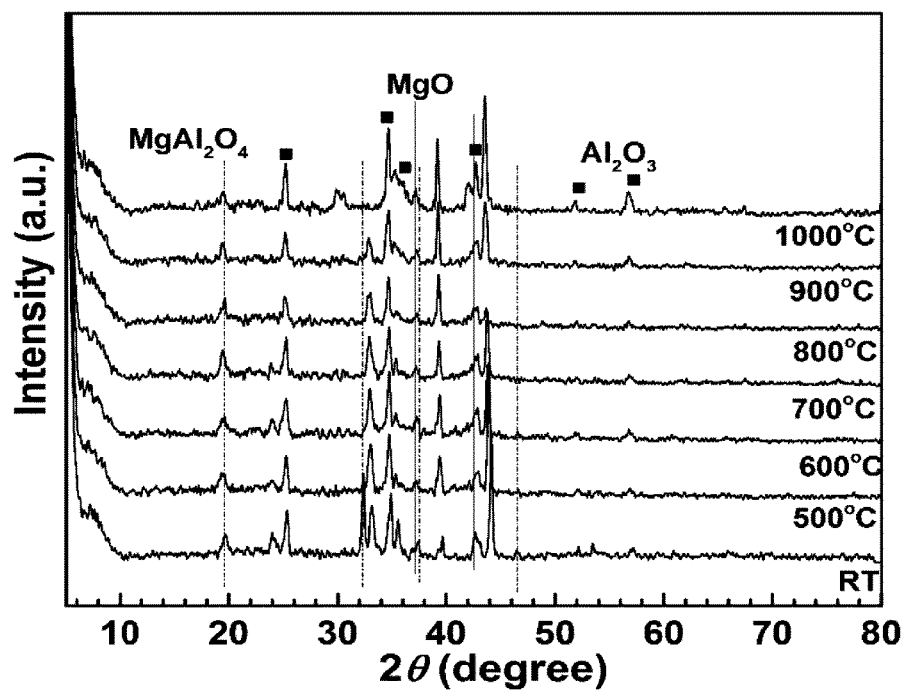

[Fig. 8]
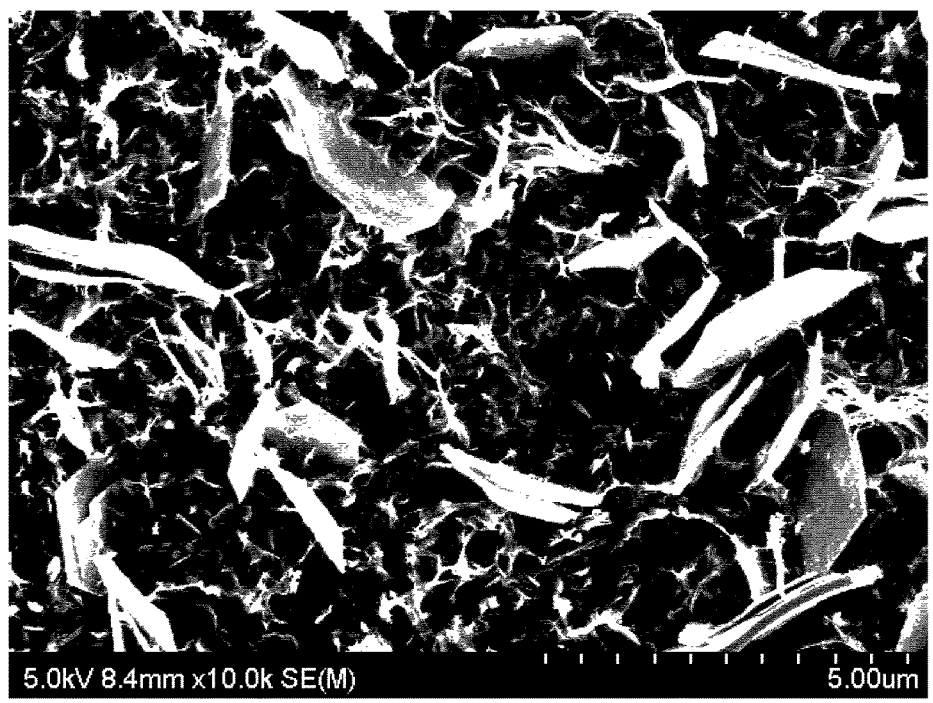

[Fig. 9]
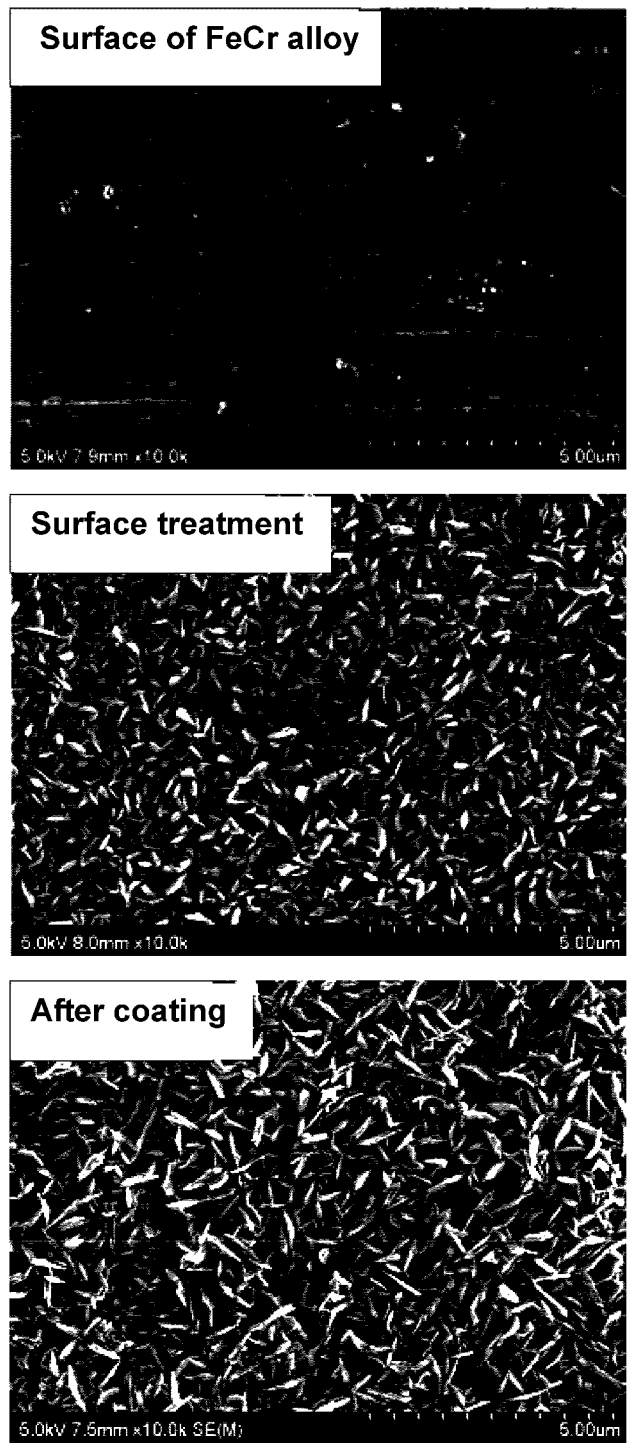

METHOD FOR FORMING COATING LAYER CONTAINING MAGNESIUM ON METAL SUPPORT, CATALYST SUPPORT AND CATALYTIC CONVERTER, INCLUDING COATING LAYER CONTAINING MAGNESIUM FORMED BY THE SAME METHOD

CROSS-REFERENCE TO RELATED APPLICATION

This application claims priority to and the benefit of Korean Patent Application No. 10-2017-0045820, filed on Apr. 10, 2017, the disclosure of which is incorporated herein by reference in its entirety.

BACKGROUND OF THE INVENTION

Field of the Invention

The present invention relates to a method for forming a coating layer containing magnesium on the surface of a metal support. More specifically, the present invention relates to a method for forming a carrier layer containing a magnesium component on the surface of a metal support by forming a precipitate containing magnesium on the surface of the metal support and calcinating the precipitate.

Description of the Related Art

A catalytic converter has been used in chemical processes such as hydrogen production and desulfurization, in devices for post-treatment of exhaust gases from vehicles, and the like. The catalytic converter is adapted to have a construction in which catalysts made from noble metals such as nickel, ruthenium, platinum, palladium, rhodium, and the like are carried on a carrier layer formed on the surface of a catalyst support.

The catalyst support is made of a ceramic or metal, and is constructed to form a passage of reactants passing through the catalytic converter. The catalyst support may be made into a metal support having various shapes such as felt, mat, mesh, foam, foil, monolith, or pin. The carrier layer is formed by coating a ceramic such as alumina ($Al_2O_3$), magnesia (MgO), magnesium aluminate ($MgAl_2O_4$), boehmite, silica, titania, and the like on the surface of the catalyst support, and functions to carry catalysts.

Among materials used as a carrier layer, magnesia is a material used as a carrier layer in a catalytic converter for oxidative coupling of methane, which is a high temperature reaction, and the like, including reforming reactions for producing hydrogen and synthetic gases. Magnesia has a property of being relatively stable at a high temperature and basic, which prevents catalysts from forming coke, thereby enhancing the durability of the catalysts.

In addition, magnesium aluminate ($MgAl_2O_4$) is a material produced by combination of magnesia and alumina, and has a crystalline structure of spinel type. Magnesium aluminate has a characteristic that due to its property of being relatively stable at a high temperature and basic, it exhibits greater coke resistance compared to a carrier made of alumina. In the reforming reaction for hydrogen production, a $Ni/Al_2O_3$ catalyst having a nickel catalyst carried on an alumina carrier layer has been mainly used. However, the $Ni/Al_2O_3$ catalyst has problems that it forms $NiAl_2O_4$ in a high temperature reaction, which causes the active area of the nickel catalyst to be reduced, and it is easily inactivated due to the deposition of coke. As an alternative to solve such problems, a $Ni/MgAl_2O_4$ catalyst having a nickel catalyst carried on a magnesium aluminate carrier layer has been recently drawing attention.

Since the catalytic converter is generally used at a high temperature, due to the difference of thermal expansion coefficients between the catalyst support and the carrier layer, carriers may be detached from the catalyst support, which results in deterioration of the durability and activity of the catalyst converter. Therefore, it is required to increase the binding strength between the catalyst support and the carrier layer. Also, it is required to increase the specific surface area of the carrier layer, which allows for the catalysts to be carried in a highly dispersed state and causes increased likelihood that reactants are contacted with catalysts, thereby resulting in improved catalytic activity and conversion efficiency.

In an effort to increase not only the binding strength between the catalyst support and the carrier layer but also the specific surface area of the carrier layer, Korean Patent No. 10-1019234 (Patent Literature 1) of the present inventors discloses a method of producing a metal structure through a step of performing electrochemical surface treatment, which allows for a metal oxide to be formed on the surface of the metal support by controlling the applied voltage and the concentration of electrolytes in an electrolyte solution; and a step of performing heat treatment in a heating furnace under an oxidizing atmosphere, which allows for the amorphous metal oxide formed on the metal support to be crystallized or for only the metal oxide of a specific metal component in the alloy to be formed. Patent Literature 1 discloses using the metal oxide thus formed on the surface of the metal structure, as a catalyst carrier, to carry catalysts, or further applying a coating of an additional catalyst carrier to the metal oxide to carry catalysts.

FIG. 1 is schematic views illustrating constructions, in which catalysts are carried on a metal oxide layer formed from a catalyst support, according to a prior art Patent Literature 1.

Referring to FIG. 1, FIG. 1A is a schematic view illustrating that a metal oxide 20 is used as a catalyst carrier and catalysts 30 are directly carried on the metal oxide 20, wherein the metal oxide 20 has been formed on the surface of a catalyst support 10 by an electrochemical surface treatment step and a heat treatment step.

When the catalysts 30 were directly carried on the metal oxide 20 as in FIG. 1A, wherein the metal oxide 20 had been formed on the catalyst support by an electrochemical surface treatment step and a heat treatment step, it was confirmable that the binding strength between the catalysts 30 and the metal oxide 20, and the catalytic activity were not high.

FIG. 1B is a schematic view illustrating that a metal oxide 20 is used as an intermediate layer, wherein the metal oxide 20 has been formed on the surface of the catalyst support 10 by an electrochemical surface treatment step and a heat treatment step, and then an additional carrier coating layer 40 is formed on the metal oxide 20. Such construction is intended to solve the problems that the binding strength between the catalysts 30 and the metal oxide 20 and the catalytic activity deteriorate, which may occur when the catalysts 30 are directly carried on the metal oxide 20. FIG. 1B represents a construction in which the thus formed carrier coating layer 40 is used as a carrier layer and the catalysts 30 are carried thereon.

When the carrier coating layer 40 is formed on the metal oxide 20, and then the catalysts 30 are carried on the carrier coating layer 40 as in FIG. 1B, the binding strength between the carrier coating layer 40 and the catalysts 30 is improved, thereby resulting in increased catalytic activity.

CITATION LIST

Patent Literature
Patent Literature 1: Korean Patent No. 10-1019234

SUMMARY OF THE INVENTION

An object of the present invention is to provide a method for forming, on the surface of a metal support, a coating layer containing a magnesium component such as magnesia or magnesium aluminate, wherein the coating layer exhibits stability at a high temperature and high coke resistance when used as a carrier layer.

The objects of the present invention are not limited to the aforementioned object. Other objects which are not mentioned will be able to be clearly understood to those of ordinary skill in the art from the following description.

In order to achieve the above objects, an embodiment of the invention provides a method for forming a magnesium (Mg)-containing coating layer on the surface of a metal support, which comprises a first step of preparing a precursor solution containing a magnesium component; a second step of forming a precipitate on the surface of a metal support by immersing and aging the metal support in the precursor solution prepared in the first step; and a third step of forming a magnesium-containing coating layer on the surface of the metal support by calcinating the precipitate formed in the second step.

In an embodiment of the invention, in the first step, the precursor solution may be prepared by adding a precipitant to a solution in which a magnesia precursor has been dissolved in distilled water.

In an embodiment of the invention, the magnesia precursor may be any one or more of magnesium nitrate ($Mg(NO_3)_2 \cdot 6H_2O$), magnesium chloride ($MgCl_2 \cdot 6H_2O$) or magnesium acetate (($CH_3COO)_2Mg \cdot 4H_2O$).

In an embodiment of the invention, the precipitant may be any one or more of ammonia ($NH_3$) or urea ($CO(NH_2)_2$).

In an embodiment of the invention, the magnesia precursor in the precursor solution may have a concentration ranging from 50 to 1000 mM.

In an embodiment of the invention, the precursor solution may have a pH ranging from 5 to 10.

In an embodiment of the invention, in the second step, the metal support may be immersed in the precursor solution at 25 to 200° C. for 0.5 to 100 hours to form a precipitate.

In an embodiment of the invention, in the second step, the metal support may be immersed in the precursor solution at 25 to 90° C. to form a precipitate.

In an embodiment of the invention, in the second step, the metal support may be immersed in the precursor solution for 0.5 to 72 hours to form a precipitate.

In an embodiment of the invention, in the third step, calcination of the precipitate may be performed at 200 to 1200° C.

In an embodiment of the invention, in the third step, calcination of the precipitate may be performed at 500 to 1000° C.

In an embodiment of the invention, in the third step, calcination of the precipitate may be performed under an oxidizing atmosphere.

In an embodiment of the invention, prior to the first step, an alumina ($Al_2O_3$) coating step may be further included to cause an alumina layer to be coated on the surface of the metal support.

In an embodiment of the invention, in the first step, the precursor solution may be prepared by adding a precipitant to a solution in which a magnesia precursor and an alumina precursor have been dissolved in distilled water.

In an embodiment of the invention, the alumina precursor may be any one or more of aluminum nitrate ($Al(NO_3)_3 \cdot 9H_2O$), aluminum chloride ($AlCl_3 \cdot 6H_2O$) or aluminum acetate ($C_2H_5AlO_4$).

In an embodiment of the invention, the precursor solution may have a pH ranging from 1.5 to 10.

In an embodiment of the invention, the metal support may be made of any one material, or an alloy of two or more, selected from the group consisting of a FeCr alloy, stainless steel, aluminum, titanium, and SiC.

In an embodiment of the invention, the metal support may be in the form of felt, mat, mesh, foam, foil, monolith, or pin.

In an embodiment of the invention, prior to the first step, any one or more of an electrochemical surface treatment step or a heat treatment step may be performed for the metal support.

In order to achieve the above objects, other embodiment of the invention provides a catalyst support including a magnesium-containing coating layer formed by the above described method.

In order to achieve the above objects, yet other embodiment of the invention provides a catalytic converter adapted to have catalysts carried on a magnesium-containing coating layer which has been formed on the catalyst support by the above described method.

BRIEF DESCRIPTION OF THE DRAWINGS

FIG. 1 is schematic views illustrating constructions, in which catalysts are carried on the catalyst support produced according to a prior art.

FIG. 2 is a schematic view illustrating a method for forming a magnesium component-containing coating layer on the surface of a metal support, according to the present invention.

FIG. 3 is a SEM photograph of magnesia particles formed on the surface of a FeCr alloy, according to Example 1.

FIG. 4 is XRD patterns depending on calcination temperatures after the magnesia coating, according to Example 1.

FIG. 5 is a SEM photograph of magnesia-magnesium aluminate particles formed on the surface of a FeCr alloy, according to Example 2.

FIG. 6 is a cross-sectional photograph of a FeCr alloy monolith on which a magnesia-magnesium aluminate layer has been coated, according to Example 2.

FIG. 7 is XRD patterns depending on calcination temperatures after the magnesia-magnesium aluminate coating, according to Example 2.

FIG. 8 is a SEM photograph of magnesia-magnesium aluminate particles formed on the surface of a FeCr alloy, according to Example 3.

FIG. 9 is a SEM photograph of a FeCr alloy monolith which has been coated using ammonia, according to Comparative Example 1.

DETAILED DESCRIPTION OF THE PREFERRED EMBODIMENTS

Hereafter, the present invention will be described with reference to the accompanying drawings. However, the present invention is not limited to the following embodiments since it may be embodied in a variety of different forms. Also, in order to clearly describe the present invention, the parts which are irrelevant to the description are omitted in the drawings, and like reference numerals refer to like elements throughout the specification.

Throughout the specification, reference to two parts being "linked (connected, contacted, or bound)" includes a case that they are "directly linked" as well as a case that they are "indirectly linked" through another member interposed therebetween. Also, when reference is made to the term "comprise" or "include," or any other variation thereof such as "comprises," "comprising," "includes," or "including," it is intended to imply the inclusion of stated elements but not the exclusion of any other elements, unless explicitly indicated to the contrary.

The terms as used herein are only intended to explain specific embodiments, not to limit the present invention. The references "a," "an" and "the" are generally inclusive of the plurals of the respective terms, unless the context clearly dictates otherwise. As used herein, the term "comprise," "include," "have," or any other variation thereof is intended to designate the presence of stated features, numerals, steps, actions, components, parts or combinations thereof, not to preclude the possibility that one or more of other features, numerals, steps, actions, components, parts or combinations thereof are present or added.

The present invention will now be described in detail with reference to the accompanying drawings.

FIG. 2 is a schematic view illustrating a method for forming a magnesium component-containing coating layer on the surface of a metal support, according to the present invention.

Referring to FIG. 2, a method for forming a magnesium-containing coating layer according to the present invention comprises three steps, that is, a first step of preparing a precursor solution containing a magnesium component; a second step of forming a precipitate on the surface of a metal support by immersing and aging the metal support in the precursor solution; and a third step of forming a magnesium component-containing coating layer on the surface of the metal support by calcinating the formed precipitate.

In the first step, the precursor solution is prepared by adding a precipitant to a solution in which a magnesia precursor has been dissolved in distilled water. The magnesia precursor means a compound which is at the stage previous to forming a magnesium oxide. It is possible to use magnesium nitrate ($Mg(NO_3)_2 \cdot 6H_2O$), magnesium chloride ($MgCl_2 \cdot 6H_2O$) or magnesium acetate (($CH_3COO$)$_2Mg \cdot 4H_2O$), and the like, either alone or in admixture of two or more thereof. It is preferred that the magnesia precursor in the precursor solution may have a concentration ranging from 50 to 1000 mM.

The precipitant means a reactant used for a precipitation reaction in which soluble ionic substances undergo an ion exchange to form a precipitate which is an insoluble solid. Specific examples of the precipitant include KOH, NaOH, ammonia ($NH_3$), urea ($CO(NH_2)_2$), $Na_2CO_3$, $K_2CO_3$, and the like.

The precursor solution is obtained by mixing the magnesia precursor and the precipitant into a liquid solvent such as water (distilled water), wherein the mixing may be achieved by supplying the precipitant at a constant rate into a solution in which the magnesia precursor has been mixed into the liquid solvent, or by adding the precipitant and the magnesia precursor simultaneously into the liquid solvent.

The pH at which the precipitate is formed may vary depending on the type of the substance which forms a magnesium-containing coating layer. The pH of the mixed solution is preferably ranged from 5 to 10. The size and shape of metal oxide particles may be controlled by varying the pH of the mixed solution, depending on the concentration or amount used of the precipitant.

The metal support may be made of any one material, or an alloy of two or more, selected from the group consisting of stainless steel, a FeCr alloy, aluminum, titanium, and SiC, but not limited thereto. Also, the metal support may be in the form of felt, mat, mesh, foam, foil, monolith, pin, or the like but not limited thereto.

As can be seen from FIG. 2, in the second step, the metal support is contacted with the precursor solution including a magnesia precursor and a precipitant to form magnesium component-containing precipitate particles on the surface of the metal support. For example, the magnesium component-containing precipitate may be magnesium hydroxide. Calcination of the precipitate particles formed on the surface of the metal support causes a coating layer to be formed on the surface of the metal support, wherein the coating layer is comprised of magnesia, which is a magnesium oxide, and the like.

The temperature and time conditions for the second step, in which the metal support is contacted with the precursor solution to form precipitate particles, vary depending on the type of the precipitant, and the concentration and amount of the magnesium-containing precursor. The second step may be performed at a temperature range of 25 to 200° C. for 0.5 to 100 hours, and particularly, is preferably performed at a temperature range of 25 to 90° C. for 5 to 72 hours.

If the second step is performed at a temperature too low, the reaction rate between the precipitant and the magnesium-containing precursor becomes slow, resulting in poor production of primary particles. On the other hand, if the second step is performed at a temperature too high, the reaction rate becomes fast, making it difficult to control the size of the primary particles. Further, if the second step is performed for a too short period of time, the size of the primary particles becomes small and poor crystal growth occurs. On the other hand, if the second step is performed for a too long period of time, the size of the primary particles becomes too large, which is undesirable.

The third step is a step of forming a coating layer containing magnesium such as magnesia by oxidizing the magnesium component-containing precipitate formed on the surface of the metal support. Calcination may be performed at a temperature range of 200 to 1200° C. under an oxidizing atmosphere. Particularly, calcinations is preferably performed at a temperature range of 500 to 1000° C.

If the third step is performed at a temperature too low, crystal formation of a magnesium oxide does not occur. On the other hand, if the third step is performed at a temperature too high, surface aggregation occurs, resulting in reduced surface area of the magnesium-containing coating layer. Also, the calcination process is performed under an oxidizing atmosphere, and any process is possible as long as it is a commonly used oxidation process.

In the method of forming a magnesium component-containing coating layer on the surface of the metal support according to the present invention, prior to the first step, an alumina ($Al_2O_3$) coating step, which causes an alumina layer to be coated on the surface of the metal support, may be performed to form an alumina layer, which acts as an intermediate layer between the metal support and the magnesium component-containing coating layer. The alumina layer formed on the surface of the metal support leads to the particle formation in the coating layer containing magnesium such as magnesia, thereby acting as an intermediate layer which allows for a more uniform formation of the magnesium-containing coating layer.

Further, in the method of forming a magnesium component-containing coating layer on the surface of the metal support according to the present invention, the precursor solution prepared in the first step may be prepared by adding a precipitant to a solution in which a magnesia precursor as well as an alumina precursor has been dissolved in distilled water. If the precursor solution is prepared in the first step such that it includes both the magnesia precursor and the alumina precursor, both a precipitate including magnesium such as magnesium hydroxide and a precipitate including aluminum such as aluminum hydroxide are formed in the second step. In this case, if calcination is performed in the third step, a coating layer is formed on the surface of the metal support wherein the coating layer has compound particles, which include magnesium oxide such as magnesia as well as aluminum such as magnesium aluminate, dispersed evenly therein.

In the method of forming a magnesium component-containing coating layer on the surface of the metal support according to the present invention, prior to the first step, any one or more of an electrochemical surface treatment step or a heat treatment step as disclosed in Patent Literature 1 (Korean Patent No. 10-1019234) may be performed in order to form a metal oxide, which acts as an intermediate layer between the metal support and the magnesium component-containing coating layer.

The electrochemical surface treatment step is a step of forming a metal oxide on the surface of a metal support by controlling the applied voltage and the concentration of electrolytes in an electrolyte solution. The heat treatment step is a step of performing heat treatment in a heating furnace under an oxidizing atmosphere in order for the amorphous metal oxide formed on the metal support to be crystallized or for only the metal oxide of a specific component in the alloy to be formed.

The metal oxide formed on the surface of the metal support by the electrochemical surface treatment or heat treatment step is positioned between the metal support and the magnesium-containing coating layer to be formed through the first to third steps which constitute the method of forming a magnesium-containing coating layer according to the present invention. Thus, the metal oxide acts as an intermediate layer which increases the binding strength between the metal support and the magnesium-containing coating layer.

As for the metal support having a magnesium-containing coating layer formed on its surface according to the present invention, the metal support and the magnesium-containing coating layer acting as a carrier layer are chemically bound, resulting in increased binding strength therebetween. Further, the specific surface area of the carrier layer becomes large as the magnesium-containing coating layer is formed on the surface of the metal support while creating a structure in which particles having a polygonal or needle-like or plate-like shape are combined as can be seen from the Examples described below.

Example 1. Formation of an MgO Coating Layer on the Surface of a FeCr Alloy

In this Example, a monolith made of a FeCr alloy was used as a metal support, and an electrochemical surface treatment was performed as disclosed in Patent Literature 1 (Korean Patent No. 10-1019234) and a heat treatment was performed at 900° C. for 6 hours.

In order to form a magnesia (MgO) coating layer as a carrier layer on the surface of the FeCr alloy monolith which had been subjected to a surface treatment and a heat treatment, a magnesia precursor solution having a pH of 10 and a concentration of 300 mM was prepared by adding urea ($CO(NH_2)_2$) as a precipitant to a solution in which magnesium nitrate ($Mg(NO_3)_2 \cdot 6H_2O$) as a magnesia precursor had been dissolved in distilled water.

The FeCr alloy monolith, which had been subjected to an electrochemical surface treatment and a heat treatment, was immersed in the prepared precursor solution and aged at 90° C. for 72 hours to form magnesium hydroxide as a precipitate on the surface of the monolith.

After aging, the monolith was dried and calcinated under an oxidizing atmosphere. It was confirmed that a magnesia coating layer was formed on the surface of the FeCr alloy monolith.

In order to investigate the effect of a calcination temperature, calcination was performed at each temperature while varying the calcination temperature from 500 to 1000° C.

FIG. 3 is a SEM photograph of magnesia particles formed on the surface of the FeCr alloy, according to Example 1. Referring to FIG. 3, it was confirmable that a coating layer, which is comprised of magnesia particles having a polygonal shape, was formed on the surface of the FeCr alloy monolith.

FIG. 4 is XRD patterns depending on calcination temperatures after the magnesia coating, according to Example 1. Referring to FIG. 4, XRD analysis of the surface of the magnesia-coated FeCr alloy depending on the calcination temperatures exhibits that, due to the crystal growth of magnesia, the peak strength was increased as the calcination temperature was raised.

Example 2. Formation of an $MgO-MgAl_2O_4$ Coating Layer on the Surface of a FeCr Alloy after Coating of an $Al_2O_3$ Layer In this Example, a FeCr alloy monolith was used as a metal support, and an electrochemical surface treatment was performed as disclosed in Patent Literature 1 (Korean Patent No. 10-1019234) and a heat treatment was performed at 900° C. for 6 hours. Then, an alumina ($Al_2O_3$) layer was coated on the treated surface. It is possible to perform coating of the alumina layer in various commonly used methods, such as precipitation, spraying, wash coating.

In order to form a magnesia (MgO)-magnesium aluminate ($MgO-MgAl_2O_4$) coating layer as a carrier layer on the surface of the FeCr alloy monolith on which the alumina layer had been coated, a magnesia precursor solution having a pH of 10 and a concentration of 300 mM was prepared by adding urea ($CO(NH_2)_2$) as a precipitant to a solution in which magnesium nitrate ($Mg(NO_3)_2 \cdot 6H_2O$) as a magnesia precursor had been dissolved in distilled water.

The FeCr alloy monolith on which the alumina layer had been coated, was immersed in the prepared precursor solution and aged at 90° C. for 72 hours to form magnesium hydroxide as a precipitate on the surface of the monolith.

After aging, the monolith was dried and calcinated under an oxidizing atmosphere. It was confirmed that a magnesia-magnesium aluminate coating layer was formed on the surface of the FeCr alloy monolith.

In order to investigate the effect of a calcination temperature, calcination was performed at each temperature while varying the calcination temperature from 500 to 1000° C.

FIG. 5 is a SEM photograph of magnesia-magnesium aluminate particles formed on the surface of the FeCr alloy, according to Example 2. Referring to FIG. 5, it was confirmable that magnesia-magnesium aluminate particles having a polygonal shape were formed on the surface of the FeCr alloy monolith.

FIG. 6 is a cross-sectional photograph of the FeCr alloy monolith on which a magnesia-magnesium aluminate layer has been coated, according to Example 2. Referring to FIG. 6, it was confirmable that the alumina coating, which had been formed prior to magnesia coating, led to the formation of magnesia-magnesium aluminate particles and thus allowed for a uniform coating.

FIG. 7 is XRD patterns depending on calcination temperatures after the magnesia-magnesium aluminate coating, according to Example 2. Referring to FIG. 7, due to the crystal growth of magnesia and magnesium aluminate, the XRD peak strength was increased as the calcination temperature was raised.

Example 3. Formation of an $MgO$—$MgAl_2O_4$ Coating Layer on the Surface of a FeCr Alloy In this Example, a monolith formed of a FeCr alloy was used as a metal support, and an electrochemical surface treatment was performed as disclosed in Patent Literature 1 (Korean Patent No. 10-1019234) and a heat treatment was performed at 900° C. for 6 hours.

In order to form a magnesia (MgO)-magnesium aluminate ($MgO$—$MgAl_2O_4$) coating layer as a carrier layer on the surface of the FeCr alloy monolith which had been subjected to a surface treatment and a heat treatment, a magnesia-alumina precursor solution having a pH of 10 and a concentration of 300 mM was prepared by adding urea (CO($NH_2$)$_2$) as a precipitant to a solution in which magnesium nitrate ($Mg(NO_3)_2.6H_2O$) as a magnesia precursor and aluminum nitrate ($Al(NO3)3.9H_2O$) as an alumina precursor had been dissolved in distilled water.

The FeCr alloy monolith, which had been subjected to an electrochemical surface treatment and a heat treatment, was immersed in the prepared precursor solution and aged at 90° C. for 48 hours to form magnesium hydroxide and aluminum hydroxide as a precipitate on the surface of the monolith.

After aging, the monolith was dried and calcinated under an oxidizing atmosphere. It was confirmed that a magnesia-magnesium aluminate coating layer was formed on the surface of the FeCr alloy monolith.

FIG. 8 is a SEM photograph of magnesia-magnesium aluminate particles formed on the surface of a FeCr alloy, according to Example 3. Referring to FIG. 8, it was confirmable that particles of magnesia and magnesium aluminate having a thin hexagonal plate-like shape were formed on the surface of the FeCr alloy monolith and were evenly dispersed thereon.

Comparative Example 1. Use of Ammonia

In this Comparative Example, a FeCr alloy monolith was used as a catalyst support, and an electrochemical surface treatment was performed as disclosed in Patent Literature 1 (Korean Patent No. 10-1019234) and a heat treatment was performed at 900° C. for 6 hours.

In order to confirm that a magnesia (MgO) coating layer as a carrier layer was formed on the surface of the FeCr alloy monolith which had been subjected to a surface treatment and a heat treatment, a magnesia precursor solution was prepared by adding ammonia to a solution in which magnesium nitrate ($Mg(NO_3)_2.6H_2O$) had been dissolved in distilled water and adjusting the pH of the solution to 10.

The FeCr alloy monolith was immersed in the prepared precursor solution and aged at 90° C. for 72 hours. Then, the sample was dried and calcinated under an oxidizing atmosphere.

It was confirmed that unlike Example 1, polygonal-shaped magnesia particles were not formed on the surface of the monolith when ammonia was used.

FIG. 9 is a SEM photograph of a FeCr alloy monolith which has been coated using ammonia, according to Comparative Example 1.

Referring to FIG. 9, when ammonia was used, unlike Example 1, only alumina ($Al_2O_3$) layer formed during the surface treatment and the heat treatment was observed and the formation of polygonal-shaped magnesia particles was not observed. Also, the analysis of composition through EDS analysis exhibits that no magnesium component was measured.

Referring to FIGS. 3 to 9, the coating layer formed by a method of forming a magnesium-containing coating layer according to the present invention has a large specific surface area since it is formed on the surface of a metal support while creating a structure in which a plurality of particles having a polygonal, needle-like or plate-like shape are densely packed, as can be seen from FIGS. 3, 5 and 8. Further, the coating layer formed by a method of forming a magnesium-containing coating layer according to the present invention is chemically bound with the metal support using precipitation and calcination. Thus, when a carrier layer for carrying catalysts is formed by this method, it may have a greater binding strength with the metal support compared to one formed by a conventional method such as wash coating, thereby resulting in improved durability of the catalytic converter.

According to embodiments of the invention, a carrier layer may be formed wherein the layer is formed of magnesia or magnesium aluminate which, due to its property of being stable at a high temperature and basic, prevents catalysts from forming coke and thus enhances the durability of the catalysts.

The effects of the invention are not limited to the aforementioned effects. It should be understood that the effects include any possible effects which may be deduced from the detailed description and claims of the invention.

The aforesaid description of the present invention is for illustrative purpose only, and it is to be understood by those of ordinary skill in the art that various modifications can be easily made without altering the spirit or essential feature of the present invention. Accordingly, the foregoing embodiments should, in all aspects, be understood to be illustrative, not restrictive. For example, although the elements are described in such a way that they are used in combination, the respective elements may be embodied individually. Likewise, although the elements are described in such a way that they are used individually, the elements may be embodied in combination.

It should be construed that the scope of the present invention is defined by the appended claims and covers any possible changes and modifications which may be derived from the intended meaning and scope of the claims and equivalents thereof.

What is claimed is:

1. A method for forming a magnesium (Mg)-containing coating layer on a surface of a metal support, the method comprising:

a first step of preparing a precursor solution containing a magnesium component;

a second step of forming a precipitate on the surface of the metal support by immersing and aging the metal support in the precursor solution prepared in the first step; and a third step of forming a magnesium-containing coating layer on the surface of the metal support by calcinating the precipitate formed in the second step.

2. The method for forming a magnesium-containing coating layer on a surface of a metal support according to claim 1, wherein in the first step, the precursor solution is prepared by adding a precipitant to a solution in which a magnesia precursor is dissolved in distilled water.

3. The method for forming a magnesium-containing coating layer on a surface of a metal support according to claim 2, wherein the magnesia precursor is any one or more of magnesium nitrate ($Mg(NO_3)_2 \cdot 6H_2O$), magnesium chloride ($MgCl_2 \cdot 6H_2O$), and magnesium acetate (($CH_3COO)_2Mg \cdot 4H_2O$).

4. The method for forming a magnesium-containing coating layer on a surface of a metal support according to claim 2, wherein the precipitant is urea ($CO(NH_2)_2$).

5. The method for forming a magnesium-containing coating layer on a surface of a metal support according to claim 2, wherein the magnesia precursor in the precursor solution has a concentration ranging from 50 to 1000 mM.

6. The method for forming a magnesium-containing coating layer on a surface of a metal support according to claim 2, wherein the precursor solution has a pH ranging from 5 to 10.

7. The method for forming a magnesium-containing coating layer on a surface of a metal support according to claim 1, wherein in the second step, the metal support is immersed in the precursor solution at 25 to 200° C. for 0.5 to 100 hours to form a precipitate.

8. The method for forming a magnesium-containing coating layer on a surface of a metal support according to claim 7, wherein in the second step, the metal support is immersed in the precursor solution at 25 to 90° C. to form a precipitate.

9. The method for forming a magnesium-containing coating layer on a surface of a metal support according to claim 7, wherein in the second step, the metal support is immersed in the precursor solution for 0.5 to 72 hours to form a precipitate.

10. The method for forming a magnesium-containing coating layer on a surface of a metal support according to claim 1, wherein in the third step, calcination of the precipitate is performed at 200 to 1200° C.

11. The method for forming a magnesium-containing coating layer on a surface of a metal support according to claim 10, wherein in the third step, calcination of the precipitate is performed at 500 to 1000° C.

12. The method for forming a magnesium-containing coating layer on a surface of a metal support according to claim 1, wherein in the third step, calcination of the precipitate is performed under an oxidizing atmosphere.

13. The method for forming a magnesium-containing coating layer on a surface of a metal support according to claim 1, prior to the first step, further comprising an alumina ($Al_2O_3$) coating step to cause an alumina layer to be coated on the surface of the metal support.

14. The method for forming a magnesium-containing coating layer on a surface of a metal support according to claim 1, wherein in the first step, the precursor solution is prepared by adding a precipitant to a solution in which a magnesia precursor and an alumina precursor are dissolved in distilled water.

15. The method for forming a magnesium-containing coating layer on a surface of a metal support according to claim 14, wherein the alumina precursor is any one or more of aluminum nitrate ($Al(NO_3)_2 \cdot 9H_2O$), aluminum chloride ($AlCl_3 \cdot 6H_2O$), and aluminum acetate ($C_2H_5AlO_4$).

16. The method for forming a magnesium-containing coating layer on a surface of a metal support according to claim 14, wherein the precursor solution has a pH ranging from 1.5 to 10.

17. The method for forming a magnesium-containing coating layer on a surface of a metal support according to claim 1, wherein the metal support is made of any one material, or an alloy of two or more, selected from the group consisting of a FeCr alloy, stainless steel, aluminum, titanium, and SiC.

18. The method for forming a magnesium-containing coating layer on a surface of a metal support according to claim 1, wherein the metal support is in the form of felt, mat, mesh, foam, foil, monolith, or pin.

19. The method for forming a magnesium-containing coating layer on a surface of a metal support according to claim 1, wherein prior to the first step, any one or more of an electrochemical surface treatment step and a heat treatment step is performed for the metal support.

20. A metal support comprising a magnesium-containing coating layer formed by the method according to claim 1.

21. A catalytic converter adapted to have catalysts carried on the magnesium-containing coating layer of the metal support according to claim 20.

* * * * *